A. Fessenden,
Hand Saw.
Nº 31,231.    Patented Jan. 29, 1861.
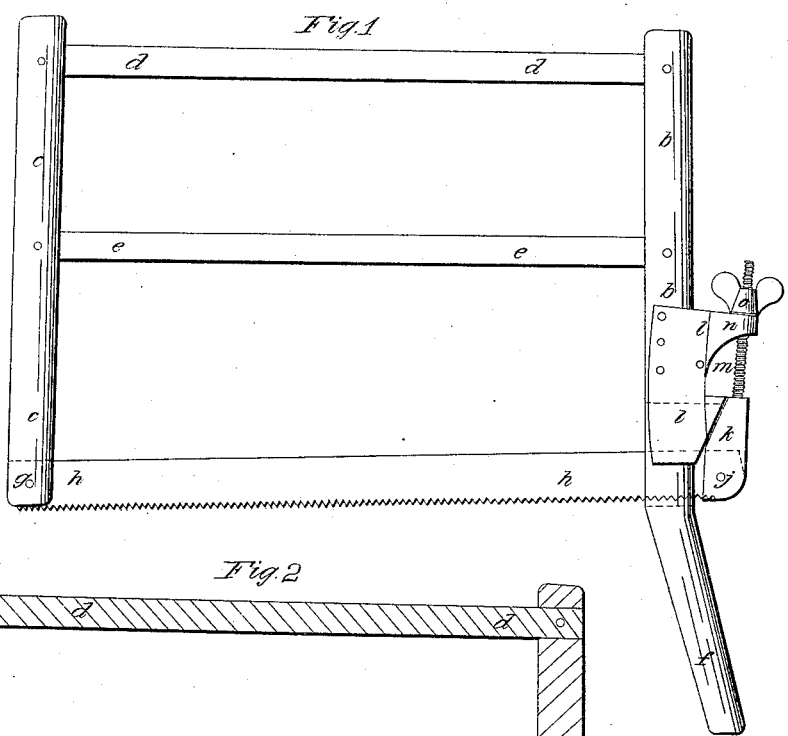
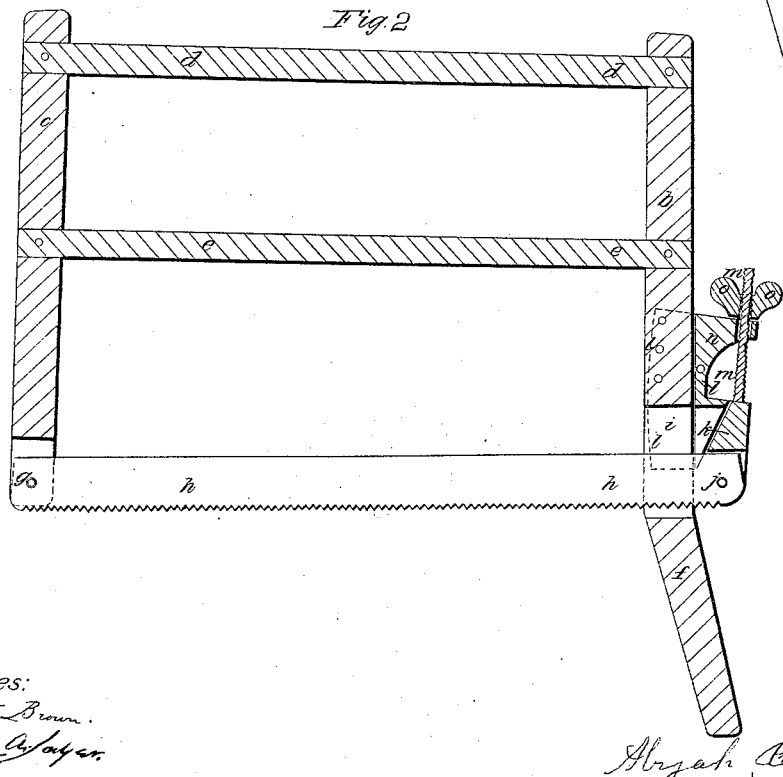
Witnesses:
A. W. Brown.
Frederic A. Sayer.
Inventor:
Abijah Fessenden

UNITED STATES PATENT OFFICE.

ABIJAH FESSENDEN, OF BOSTON, MASSACHUSETTS.

DEVICE FOR STRAINING WOOD-SAWS.

Specification of Letters Patent No. 31,231, dated January 29, 1861.

*To all whom it may concern:*

Be it known that I, ABIJAH FESSENDEN, of Boston, in the county of Suffolk and State of Massachusetts, have invented certain new and useful Improvements in Wood-Saws, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements.

Figure 1 is a side elevation of a wood saw with my improvements applied thereto. Fig. 2 is a central longitudinal vertical section of the same.

The present invention consists in a new arrangement of mechanical devices to be attached to the ordinary frames of the common wood-saws for the purpose of so tightening the saw-blade of the same as to prevent its buckling while in use.

The means heretofore employed for accomplishing the desired result of tightening the saw-blade have usually consisted of the following devices, viz: To each end of the stretcher rod of the frame is attached by mortise joints a vertical end piece, each piece having a slight power of rotation. To one extremity of each of these end pieces is secured a coil of rope, with a short lever placed in the midst of it—the saw blade being attached at the opposite extremities of the said pieces—so that by the turning of this short lever the coil of rope was twisted and shortened and thereby drew together the two extremities of the pieces to which it was directly attached, while the opposite extremities—to which the saw blade is secured—were made to separate, drawing and straightening the saw blade, in the direction of its length; the saw blade being retained in its tightened position by allowing the lever to rest against the stretcher. This mode of tightening the saw blade, it is evident is attended with many serious disadvantages, viz: The frame of the saw is very liable to be wrenched and broken by the coiling of the rope; the rope-coil also from continual use soon becomes very much worn and is liable thereby to break when the saw is being used, and the inconvenience of thus tightening the saw blade all tend to render the saw in the hands of inexperienced persons extremely unsafe and difficult to manage. My improvements however entirely obviate and overcome the above objections to the use of the common wood-saws, and by them, I am enabled to tighten the saw blade with a simple movement attended with no danger, and which permits of the frame of the saw being made perfectly tight and strong jointed.

$a$ $a$ in the drawings represent the saw-frame made of the usual form for wood-saws, of which $b$ and $c$ are the end pieces, $d$ and $e$ stretcher rods mortised to the end pieces $b$ and $c$ and tightly jointed.

$f$ is the handle.

To one of the end-pieces $c$ is attached by a pivot joint $g$ in an ordinary saw-kerf, the blade $h$, which blade extends across the whole saw-frame and passing through a saw-kerf or slot $i$ in the opposite end piece $b$ is secured by a pivot joint $j$ to a beveled edge sliding piece $k$.

To the frame $a$ or to the end piece $b$ is attached (or forming a part thereof) a projection $l$ having a beveled edge or face, upon which the sliding piece $k$ with its beveled edge bears and moves. The bevel of the projection $l$ is so made that by the moving of the sliding piece $k$ up or down upon the same the blade will be drawn in a longitudinal direction as well as in a vertical direction. To this sliding piece $k$ is attached a vertical screw $m$ passing through a standard $n$ of the piece $b$ and upon the upper end of which is a thumb-nut $o$. By the turning of this nut $o$ to the left the sliding piece $k$ will be raised and as it moves upon the beveled face of the projection $l$ it will raise the saw-blade $h$ and also cause it to be drawn in a lateral direction, thereby tightening and straightening the saw-blade to any desired degree of tension. By turning the nut $v$ in a contrary direction or to the right, the tension upon the blade can be released.

It will thus be seen that by the above described simple arrangement of mechanical devices I am enabled to tighten and straighten the blade of the saw in a most effective manner, attended with no danger to the operative and also allowing the frame to be made perfectly tight and strong, which has, as a general thing, never before been accomplished by the arrangement of devices for tightening the saw now in practical use.

Having thus described my improvements, what I claim as my invention and desire to have secured to me by Letters Patent is—

The projection $l$ attached to or forming a part of the frame of the common wood-saw and the sliding-piece $k$ secured to the blade of the saw and which moves upon the beveled edge of the said projection, the two—projection and sliding piece—being so arranged and operating together that by the upward or downward movement of the sliding piece, the tension upon the blade of the saw can be increased or diminished, substantially as hereinabove described and for the purposes specified.

ABIJAH FESSENDEN.

Witnesses:
A. W. BROWN,
FREDERIC A. LAYER.